Feb. 4, 1930.  E. F. McHUGH  1,746,088
SETTING BLOCK
Filed July 24, 1928
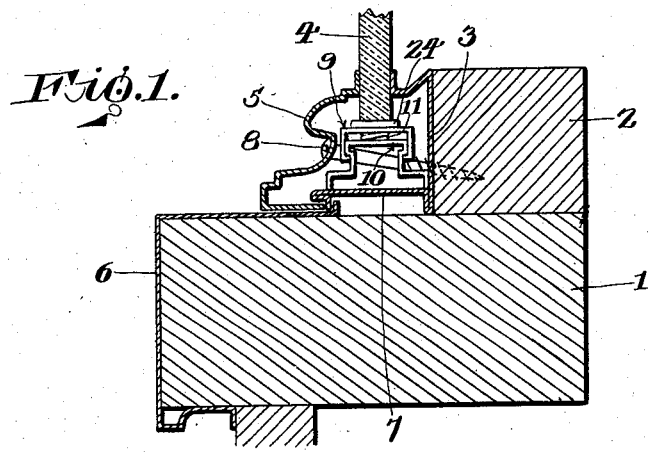
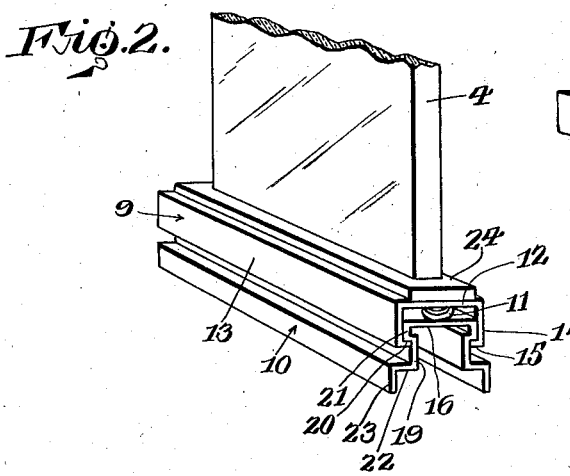
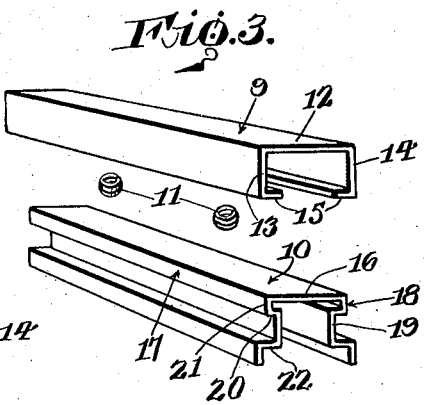
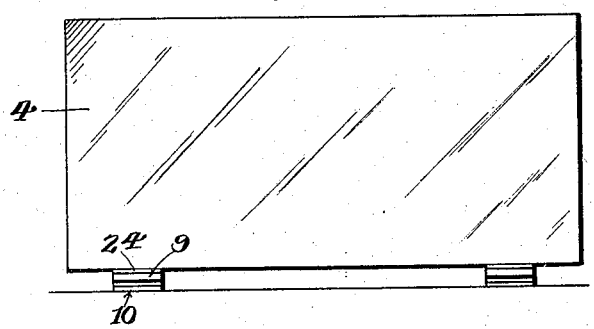
INVENTOR.
Edward F. McHugh,
BY
Geo. F. Kimmel.
ATTORNEY.

Patented Feb. 4, 1930

1,746,088

UNITED STATES PATENT OFFICE

EDWARD F. McHUGH, OF KINGSTON, PENNSYLVANIA

SETTING BLOCK

Application filed July 24, 1928. Serial No. 294,995.

This invention relates to self-levelling shock absorbing setting blocks designed primarily for use in connection with plate glass for store fronts, windows, etc., but it is to be understood that a setting block in accordance with this invention may be employed in any connection for which it is found applicable, and the invention has for its object to provide, in a manner as hereinafter set forth a block of the class referred to for offsetting shocks to the plate glass which are caused by undue vibration, heavy street cars, trucks, etc., and sharp knocks.

A further object of the invention is to provide, in a manner as hereinafter set forth a setting block for plate glass which will permit the latter levelling from end to end and from side to side, thereby providing a cushion setting in all dimensions, regardless of the condition of the glass at that particular point of rest with respect to the block.

To properly grasp the nature and purpose of a setting block, in accordance with this invention, one must bear in mind that all plate glass rests on two or more setting blocks, usually two. The sides and top of the plate glass are held by the resilient or thumb-like grip of the sash mouldings. This grip, however, simply holds the glass firmly in place, at the sides and top, and if, for any reason, the blocks were removed, the glass would work down to the solid sill. Therefore, the importance of these setting blocks is very evident, since the glass rests on them, and depends entirely upon these blocks for its support.

Then again, there are times when the glass does not break off even after being cut. In this case, the bottom edge of the glass is not at right angles with the face of the glass, and, until now, it would depend entirely upon the leather block being soft enough to permit the glass to sink down until it has a level setting. However, in due time, these leathers become weather worn, and too hard to serve this purpose, then the least vibration causes a crack in the glass. The objection referred to is overcome by a block in accordance with this invention and which will permit levelling from end to end and from side to side, thereby providing a cushion setting at all dimensions, regardless of the condition of the glass at that particular point of rest. Further a block in accordance with this invention and constructed in a manner as hereinafter referred to provides a safe setting, a safe levelling of the plate glass and further a shock absorbing means under such conditions clearly enhancing or increasing the life of the glass, and preventing cracking of the latter.

Further objects of the invention are to provide a self levelling and shock absorbing setting block, in a manner as hereinafter set forth and which is simple in its construction and arrangement, strong, durable, compact, thoroughly efficient in its use, readily assembled, conveniently installed and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a fragmentary view in vertical section illustrating a plate glass and mounting therefor and a setting block in accordance with this invention and showing the adaptation of the block with respect to the bottom edge of the glass.

Figure 2 is a perspective view of a setting block in accordance with this invention and showing the adaptation thereof with respect to a plate glass, the latter being shown fragmentary and in perspective.

Figure 3 is a perspective view of a setting block in accordance with this invention, the elements of the block being disassembled and the leather or lead cushion not illustrated.

Figure 4 is an elevation of a plate glass showing the adaptation with the bottom edge thereof with a pair of setting blocks in accordance with this invention.

Referring to the drawings in detail 1 denotes a sill, 2 a back stop secured thereon at the rear portion of the upper face thereof. Positioned against the front of the stop 2 and extended forwardly therefrom is a back member 3 of the sash for the plate glass 4. The front moulding of the sash is indicated at 5 and which has its lower portion seated upon a covering 6 for the sill 2. The backing member 3 has its lower part formed with a forwardly directed portion 7 which constitutes a cushion and which interlocks with the covering 6. The glass 4 is held by the resilient or thumb-like grip of the front moulding 5 and backing member 3. A setting block in accordance with this invention is mounted upon the forwardly directed portion 7 of the back member 3 and said portion 7 constitutes a cushion. The front moulding 5 is secured in position by holdfast devices 8, only one of which is shown. The specific disclosure of the back member and sill covering 6 will be found in my application Serial No. 294,977 filed July 24, 1928.

A self levelling and shock absorbing setting block, in accordance with this invention, includes a top member and a base member referred to generally at 9, 10 respectively, having interposed therebetween a pair of cushioning springs 11. Each of said members is of inverted channeled shape. The top member is of less height than, but of the same length as that of the base member.

The top member 9 includes a top wall 12, a pair of side walls 13, 14. The lower end of each wall 13, 14 is provided with an inwardly extending, right angularly disposed flange 15. The flanges are spaced from each other.

The base member 10 comprises a top wall 16, and a pair of side walls indicated at 17, 18 generally. Each side wall is formed with an inset central part 19, which terminates at its top in an outwardly disposed, right angularly extending part 20, which merges into a vertically disposed part 21, the latter terminating in one side of the top wall 16. The intermediate part 19 at its bottom terminates in an outwardly extending, right angularly disposed part 22 of greater cross-sectional length than the part 20 and said part 22 merges into a vertically disposed, depending part 23 which extends in a plane parallel to the plane of the part 21. The parts 19, 20 and 22 of each side wall of the base member 10 provide a longitudinally extending groove of materially greater width than the thickness of the flange at the bottom of the side walls of top member 9. The side walls 17, 18 are oppositely disposed with respect to each other and as the parts 22 of said walls project beyond the parts 20 thereof, the open bottom of the base member 10 is of greater width than the width of the top wall 16.

The flanged bottoms of the side walls 13, 14 coact with the parts 20, 22 of the side walls 17, 18 of the base member 10 for the purpose of connecting said members together. As the flanges 15 oppose the intermediate inset portion 19 of the side walls 17, 18 of the base member 10 when the members 9 and 10 are connected together, the member 9 can move relative to the member 10, and this action is had by the expansion and contraction of the springs 11, as these latter are mounted on the upper face of the top wall 16 of the member 10 and bear against the inner face of the top wall 12 of the member 9. The springs 11 provide for self-levelling of the plate glass and also as shock absorbing means.

Mounted on the upper face of the top wall 12, of the member 9, and of less width than the width of said wall 12 is a leather or lead cushion 24 of rectangular cross section. The cushion 24 is of greater length than that of the glass 4, of less width than that of the member 9, and preferably of slightly less length than the length of the latter. As shown in Figures 1 and 2 the bottom edge of the glass 4 is positioned upon the cushion 24 and which also tends to absorb shock and assists in the levelling of the glass.

The construction of the block referred to will offset shock to the plate glass and also permit levelling from end to end and from side to side thereby providing a cushioning setting for all dimensions, therefore it is thought the many advantages of a setting block, in accordance with this invention can be readily understood, and although the preferred embodiment of the invention is as illustrated and described, yet it is to be understood that changes in the details of construction can be had which fall within the scope of the invention as claimed.

What I claim is:

1. A self levelling and shock absorbing block for plate glass comprising a base member, an inverted channel shaped top member movable vertically relative to the base member and overlapping the latter, said members having coacting inherent parts for slidably connecting them together at the sides thereof, and cushioning springs interposed between the tops or said members for maintaining the tops of the latter in spaced relation throughout.

2. A self levelling and shock absorbing block for plate glass comprising a base member, an inverted channel shaped top member movable vertically relative to the base member and overlapping the latter, said members having coacting inherent parts for slidably connecting them together at the sides thereof, cushioning springs interposed between the tops of said members for maintaining the tops of the latter in spaced relation throughout, and a flat cushion mounted on the top of said top member.

3. In a self levelling and shock absorbing setting block for plate glass, a pair of overlapping, superposed, slidably interengaging connected members of equal length, the upper of said members being of inverted channel shape, and cushioning means interposed between the top of said members for maintaining the tops of the latter in spaced relation throughout, the upper of said members being vertically movable relative to the lower member.

4. In a self levelling and shock absorbing setting block for plate glass, a pair of overlapping, superposed, slidably interengaging connected members of equal length, the upper of said members being of inverted channel shape, cushioning means interposed between the top of said members for maintaining the tops of the latter in spaced relation throughout, the upper of said members being vertically movable relative to the lower member, and a flat cushioning element mounted on the top of the upper of said members.

5. In a self levelling and shock absorbing setting block for plate glass, an upper and a lower member each including a top and a pair of depending sides, said upper member mounted on, overlapping and vertically movable relative to the lower member, the sides of said members having coacting parts for slidably connecting said members together, and spaced cushioning means interposed between the tops of said members and confined by the sides of the top member.

6. In a self levelling and shock absorbing setting block for plate glass, an upper and a lower member each including a top and a pair of depending sides, said upper member mounted on, overlapping and vertically movable relative to the lower member, the sides of said members having coacting parts for slidably connecting said members together, spaced cushioning means interposed between the tops of said members and confined by the sides of the top member, and a flat one-piece cushioning element mounted on the top of the upper element.

7. In a self levelling and shock absorbing setting block for plate glass, a pair of overlapping, superposed, slidably connected interengaging members, and spaced cushioning means interposed between the tops of said members and confined by the sides of the top member, the upper of said members being vertically movable with respect to the lower member.

8. In a self levelling and shock absorbing setting block for plate glass, a pair of overlapping, superposed, slidably connected interengaging members, spaced cushioning means interposed between the tops of said members and confined by the sides of the top member, the upper of said members being vertically movable with respect to the lower member, and a flat cushioning element disposed lengthwise of the top of the upper member.

9. In a self levelling and shock absorbing setting block for plate glass an upper and a lower channel shaped member, said upper member mounted on, overlapping and vertically movable relative to the lower member, said lower member having its sides formed with longitudinally extending grooves, said upper member having its sides formed with inwardly extending flanges of materially less thickness than the width of and arranged in said grooves whereby said upper member can be vertically shifted relative to the lower member, and vertically disposed cushioning springs interposed between the tops of said members and confined by the sides of the upper member.

10. In a self levelling and shock absorbing setting block for plate glass an upper and a lower channel shaped member, said upper member mounted on, overlapping and vertically movable relative to the lower member, said lower member having its sides formed with longitudinally extending grooves, said upper member having its sides formed with inwardly extending flanges of materially less thickness than the width of and arranged in said grooves whereby said upper member can be vertically shifted relative to the lower member, and vertically disposed cushioning springs interposed between the tops of said members and confined by the sides of the upper member, the bottom of the lower member being of greater width than the width of the upper member.

11. In a self levelling and shock absorbing setting block for plate glass an upper and a lower channel shaped member, said upper member mounted on, overlapping and vertically movable relative to the lower member, said lower member having its sides formed with longitudinally extending grooves, said upper member having its sides formed with inwardly extending flanges of materially less thickness than the width of and arranged in said grooves whereby said upper member can be vertically shifted relative to the lower member, vertically disposed cushioning springs interposed between the tops of said members and confined by the sides of the upper member, and a flat, one-piece cushioning member mounted on and of less width and length than that of the top of said upper member.

12. In a self levelling and shock absorbing setting block for plate glass an upper and a lower channel shaped member, said upper member mounted on, overlapping and vertically movable relative to the lower member, said lower member having its sides formed with longitudinally extending grooves, said upper member having its sides formed with inwardly extending flanges of materially less thickness than the width of and arranged in said grooves whereby said upper member can be vertically shifted relative to the lower member, vertically disposed cushioning springs interposed between the tops of said members and confined by the sides of the upper member, the bottom of the lower member being of greater width than the width of the upper member, and a flat, one-piece cushioning member mounted on and of less width and length than that of the top of said upper member.

13. In a self levelling and shock absorbing setting block for plate glass, a stationary base member having each side thereof formed with a longitudinally extending groove opening outwardly, an inverted channel-shaped upper member having the bottoms of its sides provided with inwardly extending flanges arranged in said grooves for loosely connecting said members together whereby the upper member can be vertically shifted relative to the lower member, cushioning means interposed between said members, and a flat, one-piece cushioning element mounted upon and conforming in contour to the top of the upper member, said cushioning element having its edges arranged in proximity to the side and edge of the top of the upper member.

In testimony whereof I affix my signature hereto.

EDWARD F. McHUGH.